United States Patent
Wheaton, III et al.

[15] 3,704,723
[45] Dec. 5, 1972

[54] PVC MANIFOLD

[72] Inventors: Theodore C. Wheaton, III, Ocean City; Daniel J. Mikus, Vineland, both of N.J.

[73] Assignee: Wheaton Industries, Millville, N.J.

[22] Filed: Aug. 16, 1971

[21] Appl. No.: 175,118

[52] U.S. Cl. .................. 137/341, 137/561 A, 259/4
[51] Int. Cl. ............................................. B01f 15/02
[58] Field of Search ....259/4, 18; 239/142, 143, 402; 260/2.5; 137/608, 340, 561 A, 341

[56] References Cited

UNITED STATES PATENTS

| | | | |
|---|---|---|---|
| 2,148,414 | 2/1939 | Wolfert | 137/561 A |
| 2,931,387 | 4/1960 | Fleming | 137/608 |
| 3,462,083 | 8/1969 | Kautz | 259/4 |

*Primary Examiner*—Robert W. Jenkins
*Attorney*—Henry N. Paul, Jr. et al.

[57] ABSTRACT

Manifold for dividing molten PVC stream into a plurality of branch streams wherein the trunk passageway is divided into a plurality of diverging branch passageways none of which makes an angle of less than 110° with the trunk passageway and any adjacent two of which converge with one another at a sharp stream splitting wall intersection of 140° or less. In the preferred form of the present invention four parallel one-fourth to one-half inch secondary branch passageways are provided by dividing a first trunk passageway into two branch passageways symmetrical with respect to the trunk passageway converging with one another in an angle of about 140°, each of which is subsequently divided into secondary branches one of which makes an angle of 110° with the first branch and the other of which is coaxial with the first branch for a short distance and then is angled to parallel the other secondary branch.

6 Claims, 3 Drawing Figures

PATENTED DEC 5 1972

3,704,723

INVENTORS.
Theodore C. Wheaton III
BY Daniel J. Mikus

Paul & Paul
ATTORNEYS.

PVC MANIFOLD

This invention relates to a manifold for dividing a stream of molten polyvinylchloride into a plurality of such streams for delivery to a corresponding plurality of molds therefor. More particularly, it relates to such a manifold intended to maintain the molten condition of the PVC while preventing degradation thereof and delivering the same while in a condition of near optimum moldability.

Numerous manifolds have been developed for dividing a plastic stream, thereby to feed the plastic material into one of a plurality of molds therefor. While a great deal of expertise has been developed in optimizing the dimensions and geometry of such manifolds for various types of plastics and various types of molding apparatus, there has heretofore been no known manifold capable of dividing a stream of molten polyvinylchloride and, while preventing degradation thereof, dividing and delivering the PVC to some form of plurality of molds for molding apparatus. Generally the problem is that PVC is either degraded or delivered in a form unsuitable for molding.

The general object of this invention is to provide a manifold which will effectively divide a molten PVC stream and deliver the PVC into a plurality of branches with practically no degradation thereof and in a condition suitable not only for molding but for the injection molding of parisons which are thereafter blowable into hollow articles.

Briefly, these objects and others which will become apparent in the course of the subsequent discussion, are met by a manifold in which smooth walls are maintained throughout the trunk and branch passageways thereof. The relationship between the trunk and branch passageways is such that no branch passageway makes an angle of less than 110° with the trunk passageway and any two adjacent converging branch passageways form a closed angle between them of no more than 140°. Moreover the intersecting walls of adjacent convergent branches present a sharp, non-rounded line of intersection to split the molten PVC issuing from the trunk passageways. Each such branch passageway may in turn serve as a trunk line which is similarly split. The temperature of the passageway is generally maintained in the range of 320°F to 380°F for most types of production and the passageways are generally circular in cross-section with diameters in the range of one-quarter to one-half inch.

In the preferred form of the present invention, a single trunk passageway is divided into two branches converging symmetrically about the axis of the trunk with a converging angle of about 140°. These converging branches are in turn separated in four secondary branches, each of the primary branches being divided into one secondary branch which is coaxial with the first branch and a second secondary branch which forms an angle of 110° with the first branch. The coaxial secondary branch thereafter makes a 110° turn so that four secondary branches result which are parallel to one another and the axis of the incoming trunk passageway. Maximum diverging angles are used in this preferred embodiment so as to minimize the residence time of PVC in the manifold. In the preferred embodiment, wherein there is also included means for delivering PVC to the trunk passageway at a temperature of 320°F to 380°F, a pressure of 6,000 to 9,000 PSI and a rate of 3 to 6 grams/sec, all of the passageways are circular. The diameters of the trunk and primary and secondary branches, respectively, are all on the order of one-half inch.

This invention may be better understood by reference to the following detailed discussion taken in conjunction with the appended claims and the attached drawings, in which:

Figure 1:
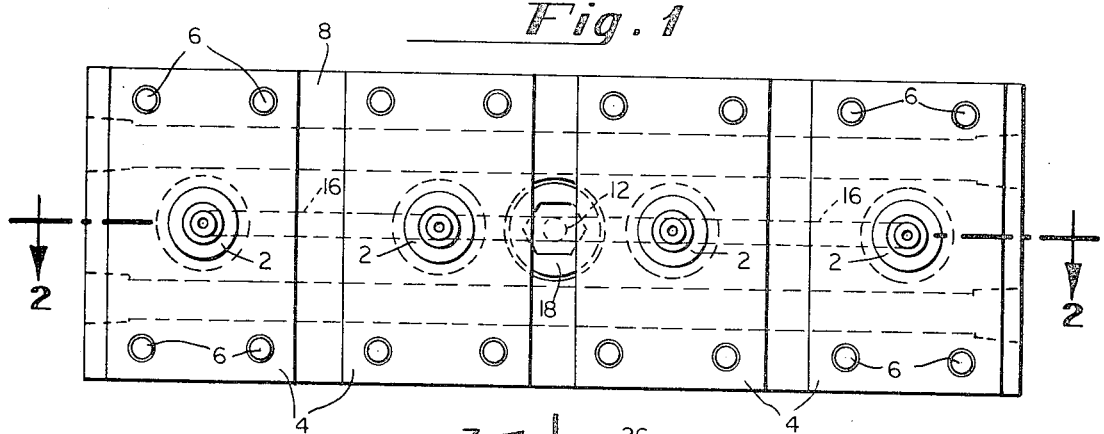
FIG. 1 is a front view of the preferred embodiment of the PVC manifold of the present invention.

Referring more specifically to FIG. 1, there is shown outlet nozzles 2 retained by manifold face plates 4 and face plate bolts 6 on manifold body 8.

Figure 2:
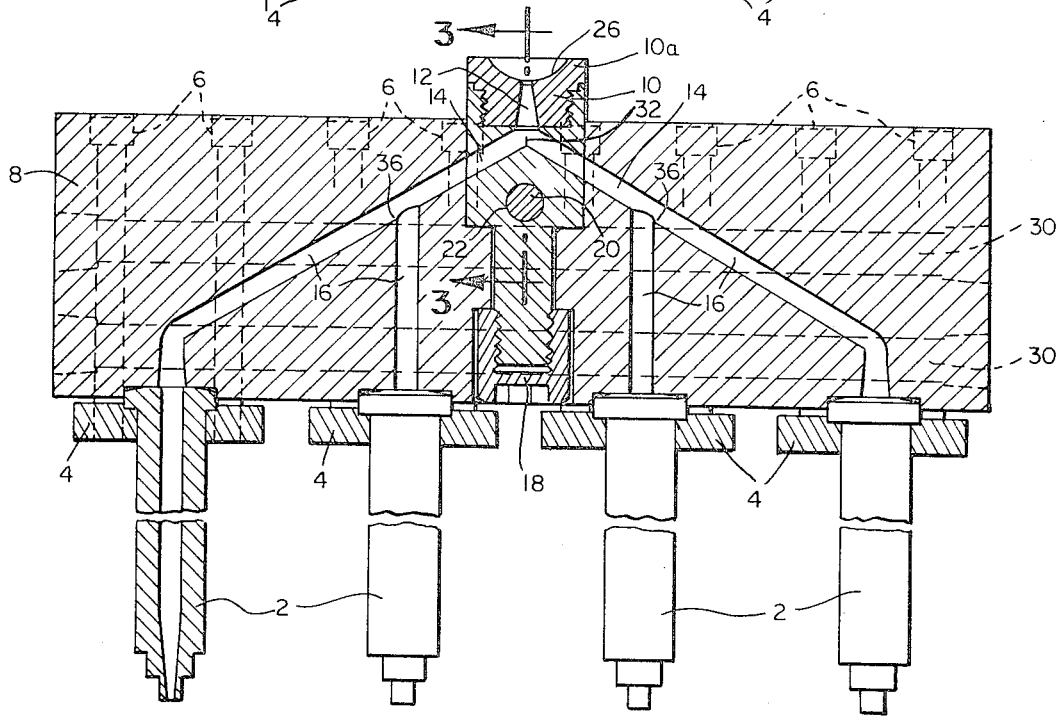
FIG. 2 is a plan view in section of the manifold shown in FIG. 1.

As shown in the sectional view of FIG. 2, manifold body 8 and manifold inlet nozzle receiving member 10 together define trunk passageway 12, primary branch passageways 14, diverging from trunk passageway 12 at angles of 110°, and secondary branch passageways 16. It will be noted that in this the preferred embodiment of the present invention, each pair of secondary branch passageways 16 includes one secondary branch which diverges from primary branch passageway 14 at an angle of 110° and a second secondary branch which continues coaxially with primary branch passageway 14 and then turns 110° to become parallel with the other secondary branch passageway of the pair. In this way four parallel secondary branch passageways result all terminating in nozzles 2.

Figure 3:
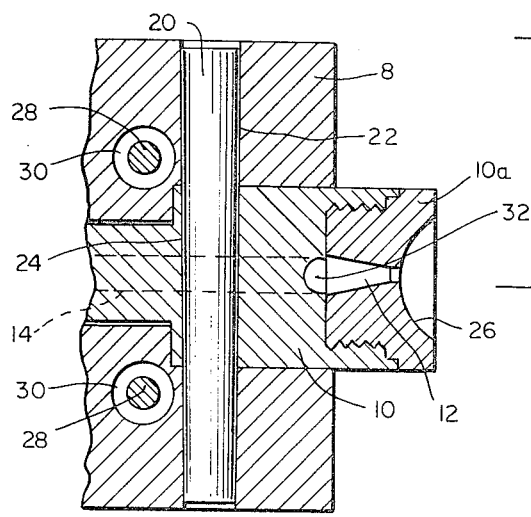
FIG. 3 is a detailed sectional view of a part of the manifold shown in FIGS. 1 and 2.

Inlet nozzle receiving member 10 is retained in manifold body 8 by retainer member 18 and, as seen in FIG. 3, the passageways of inlet nozzle receiving member 10 are maintained in alignment with those of manifold body 8 by tapered shaft member 20 seated in openings 22 and 24 therefor in manifold body 8 and inlet nozzle receiving member 10.

For various manufacturing and maintenance reasons, inlet nozzle receiving member 10 preferably comprises a threaded removable segment 10a in which is incorporated trunk passageway 12 and inlet nozzle seat 26.

Removable portion 10a of inlet nozzle receiving member 10 and tapered shaft member 20, along with openings 22 and 24 therefor, may be better seen in the detailed sectional view of FIG. 3, in which is also shown radiant heating members 28 located in openings 30 therefor in manifold body 8.

Generally, passageways 12, 14 and 16 are circular in cross-section, with diameters on the order of one-quarter to one-half inch, and have smooth interior sidewalls, free of protuberances. The lines of intersection 32 and 36 of diverging branch passageway walls are preferably sharp and unrounded. In the preferred form of the manifold shown in FIGS. 1-3, the diameters of primary branch passageways 14 and secondary branch passageways 16 are all approximately one half inch. In operation, molten PVC is supplied to inlet nozzle receiving means at a temperature in the range of 320°F to 380°F, a pressure of 6,000–9,000 PSI and a flow rate of 3 to 6 grams per section. Heating means, such as radiant heaters 28, are used to maintain the manifold at a temperature of 300°F to 350°F. Four shots, of 12 to 50 grams each, of injection moldable and blowable molten PVC are provided in each injection cycle.

As to angular disposition of trunk and branch passageway, it will be noted that in the preferred form of the invention show in FIGS. 1–3, primary branch passageways 14 each form an angle of about 110° with the axis and trunk passageway 12. This is approximately the minimum such angle possible without causing degradation of PVC at the point of flow divergence. It will be noted that secondary branch passageways 16 form angles of 180° and 110° respectively with the axis of primary branch passageways 12. In this, the preferred form of the present invention, one of the secondary branch passageways 16 on each side of the manifold is coaxial with its respective primary branch passageway 12 and continues in the same axial direction as that of primary branch passageway 12, thereafter making a 110° bend so that all four secondary branch passageways 16 exit the manifold of the present invention in parallel equally spaced relationship for convenient delivery of molten PVC to multiple mold cavities.

Apart from the smoothness of the interior sidewalls of the passageways in the manifold of the present invention, and absence of protuberances therein, it is extremely important that passageway wall intersections of converging branch passageways or, conversely considered, the diverging paths of a PVC stream being split, intersect with a sharp, non-rounded angular apex splitting the molten PVC stream. In the manifold shown in FIG. 2, such sharp, non-rounded stream splitting intersecting wall surfaces are seen at passageway wall intersections 32 and 36.

Obviously, the dimensions of the passageways in the manifold of the present invention will depend on the flow rate of material and other variables. Trunk passageways may be, although they need not be, of larger diameter than subsequent branch passageways. Generally, however, for a machine in which the molten PVC is delivered to the manifold at a pressure in the range of 6,000 to 9,000 PSI and at a rate in the range of 3 to 6 grams/sec as is the case in the apparatus in which the preferred embodiment of this invention is used, the various trunk and branch passageways are all in the range of one-quarter to one-half inch in diameter.

Utilizing the manifold of the present invention, PVC bottles have been injection blow molded on otherwise conventional injection blow molding equipment. This is in sharp contrast to prior experience which has indicated that any manifold in which a molded PVC stream is divided causes either degradation of the PVC or a change in the condition of the PVC rendering molding, and particularly injection blow molding, thereof difficult if not impossible. Passageway configurations, angular diversions, the geometry of stream splitting projections, etc. are all found to be important, as described above, in order to minimize sheer stress and resultant material buildup and/or degradation. For these reasons, the numerous interrelated requirements of the present invention are all important in providing a practical PVC manifold.

In fact, while each of these characteristics have probably previously been used in plastic manifolds individually, the combination of these characteristics and the identification of their criticality to produce a practical PVC manifold is thought to be the essence of the present invention.

It should of course be understood that while this invention has been described with respect to particular embodiments thereof, it is not limited thereto and in fact the appended claims are intended to cover all other embodiments and modifications which will be apparent to those skilled in the art and which are within the true spirit and scope of the present invention.

We claim:

1. Manifold for dividing a molten polyvinyl chloride stream in a trunk passageway into a plurality of such streams in branch passageways, said manifold defining said trunk passage-way and said plurality of branch passageways, means for maintaining all of said passageways at 300° to 350°F, all of the walls of all said passageways being smooth, any two adjacent branch passageways converging at an enclosed angle of no more than 140° with a sharp, non-rounded line of intersection therebetween, and an enclosed angle between any of said branch passageways and said trunk passageway of more than 110°.

2. Manifold, as recited in claim 1, wherein said branch passageways are in turn divided into secondary branch passageways, said secondary branch passageways also having smooth walls and means for maintaining the temperature thereof in the range of 300° to 350°F, said secondary branch passageways forming no angle with said first branch passageway of less than 110°, any adjacent two of said secondary branch passageways converging at an angle of no more than 140° with a sharp line of intersection therebetween.

3. Manifold, as recited in claim 2, wherein all of said passageways are circular in cross-section, wherein the diameter of said trunk passageway is one-quarter to one-half inches, the diameter of said branch passageways is one-quarter to one-half inches, and the diameter of said secondary branch passageways is one-quarter to one-half inches, and wherein said trunk passageway is divided symmetrically into two branch passageways converging with an enclosed angle therebetween of 140°, each of said branch passageways in turn being divided into two secondary branch passageways, one of said secondary branches being coaxial with said branch, thereafter making an 110° bend, the other of said secondary branches intersecting said branch at 110°, all of said intersections and bends being such as to result in four secondary branch passageways all parallel to the axis of the trunk passageway.

4. Manifold, as recited in claim 3, wherein the diameters of all of said passageways is on the order of one half inch.

5. Manifold, as recited in claim 1, combined with a means for supplying polyvinyl chloride at a temperature of 320° to 380°F, a pressure of 6,000 to 9,000 PSI, and a rate of 3 to 6 grams/second, said passageways being circular in cross-section and having a diameter of one-quarter to one-half inch diameter.

6. Manifold, as recited in claim 1, wherein said trunk passageway is circular in cross-section, has a diameter of one-quarter to one-half inch and is divided into two branch passageways, each circular in cross-section with a diameter of one-quarter to one-half inches, said branch passageways converging at an angle of 140° and each intersecting said trunk passageway at 110°.

* * * * *